(12) United States Patent
Park et al.

(10) Patent No.: US 8,903,930 B2
(45) Date of Patent: Dec. 2, 2014

(54) GROUP-BASED M2M COMMUNICATION METHOD

(75) Inventors: Giwon Park, Anyang-si (KR); Inuk Jung, Anyang-si (KR); Youngsoo Yuk, Anyang-si (KR); Jin Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 281 days.

(21) Appl. No.: 13/639,862

(22) PCT Filed: Apr. 7, 2011

(86) PCT No.: PCT/KR2011/002450
§ 371 (c)(1),
(2), (4) Date: Oct. 6, 2012

(87) PCT Pub. No.: WO2011/126321
PCT Pub. Date: Oct. 13, 2011

(65) Prior Publication Data
US 2013/0046841 A1  Feb. 21, 2013

Related U.S. Application Data

(60) Provisional application No. 61/321,502, filed on Apr. 7, 2010, provisional application No. 61/334,181, filed on May 13, 2010.

(51) Int. Cl.
| | |
|---|---|
| *G06F 15/16* | (2006.01) |
| *H04W 4/08* | (2009.01) |
| *H04W 8/18* | (2009.01) |
| *H04W 4/00* | (2009.01) |
| *H04W 4/06* | (2009.01) |

(52) U.S. Cl.
CPC ................ *H04W 4/08* (2013.01); *H04W 8/186* (2013.01); *H04W 4/005* (2013.01); *H04W 4/06* (2013.01)
USPC ........................................................ 709/206

(58) Field of Classification Search
CPC ....... H04W 4/08; H04W 4/005; H04W 8/186; H04W 4/06
USPC .......................................................... 709/206
See application file for complete search history.

(56) References Cited

U.S. PATENT DOCUMENTS

2005/0226430 A1* 10/2005 Kreifeldt et al. ................. 381/58
2006/0165035 A1   7/2006 Chandra et al.
(Continued)

FOREIGN PATENT DOCUMENTS

| KR | 10-2007-0100580 | 10/2007 |
|---|---|---|
| WO | 2006/125579 | 11/2006 |

(Continued)

*Primary Examiner* — Kostas Katsikis
(74) *Attorney, Agent, or Firm* — Lee, Hong, Degerman, Kang & Waimey

(57) ABSTRACT

A specific M2M communication device according to the present invention is grouped with other M2M communication devices, and performs communication with a base station as a representative of the group. To this end, at least one of location information, battery information and signal quality information of a corresponding M2M communication device is provided to a base station during the initial network entry with the base station. On the basis of this, the base station then provides a message announcing that the specific M2M communication device has been selected as a representative of the group (also called a 'group head'), together with a group ID and a group head ID. Accordingly, the M2M communication device thus selected as the representative of the group is able to perform the transmission of uplink and/or downlink signals with the base station, while representing the group.

15 Claims, 11 Drawing Sheets

(56) References Cited

U.S. PATENT DOCUMENTS

| | | | |
|---|---|---|---|
| 2008/0301303 A1* | 12/2008 | Matsuoka | 709/227 |
| 2010/0013304 A1* | 1/2010 | Heineman | 307/31 |
| 2010/0318911 A1* | 12/2010 | Holladay et al. | 715/716 |
| 2012/0004003 A1* | 1/2012 | Shaheen et al. | 455/509 |
| 2012/0214520 A1* | 8/2012 | Bergqvist et al. | 455/458 |
| 2013/0132854 A1* | 5/2013 | Raleigh et al. | 715/738 |
| 2014/0098671 A1* | 4/2014 | Raleigh et al. | 370/235 |

FOREIGN PATENT DOCUMENTS

| | | | | |
|---|---|---|---|---|
| WO | WO 2010049801 A1 * | 5/2010 | | H04W 72/04 |
| WO | WO 2011098128 A1 * | 8/2011 | | H04W 72/04 |

* cited by examiner

GROUP-BASED M2M COMMUNICATION METHOD

CROSS-REFERENCE TO RELATED APPLICATIONS

This application is the National Stage filing under 35 U.S.C. 371 of International Application No. PCT/KR2011/002450, filed on Apr. 7, 2011, which claims the benefit of U.S. Provisional Application Ser. No. 61/321,502, filed on Apr. 7, 2010, and U.S. Provisional Application Ser. No. 61/334,181, filed on May 13, 2010, the contents of which are all hereby incorporated by reference herein in their entirety.

TECHNICAL FIELD

The present invention relates to a group-based machine to machine (M2M) communication method and an M2M communication device for the same.

BACKGROUND ART

Machine-to-machine (M2M) communication is communication between electronic devices as its appellation implies. While M2M communication means wired or wireless communication between electronic devices or communication between a human-controlled device and a machine in the broadest sense, these days M2M communication typically refers to wireless communication between electronic devices.

When the concept of M2M communication was introduced in the early 1990s, it was regarded merely as the concept of remote control or telematics and the market therefor was very limited. However, M2M communication has been drastically developed and the M2M communication market has attracted much attention all over the world over the past few years. Especially, M2M communication has a great influence in the fields of fleet management, remote monitoring of machines and facilities, smart metering for automatically measuring the working time of construction equipment and the consumption of heat or electricity, etc. in the Point Of Sales (POS) market and security-related applications. It is expected that M2M communication will find various uses in conjunction with legacy mobile communication, very high-speed wireless Internet or Wireless Fidelity (WiFi), and low-output communication solutions such as ZigBee and thus will extend to Business to Customer (B2C) markets beyond Business to Business (B2B) markets.

However, if M2M communication is rapidly spread and extensively used as described above, an overhead problem may occur due to communication between the M2M devices or between the M2M devices and the base station. Therefore, it is necessary to propose a communication method capable of efficiently solving the overhead problem in consideration of characteristics of the M2M communication scheme.

DISCLOSURE

Technical Problem

In accordance with one aspect of the present invention, a method for selecting a group head for forming a group between M2M devices in M2M communication is disclosed. If all M2M devices communicate with the base station (BS) on the condition that numerous devices exist in M2M communication, there is a high possibility of causing a large amount of load (signaling overhead, collision, etc.) in an air interface between an M2M device and a base station (BS). Therefore, the following M2M communication technique proposes a method for forming a group between M2M devices, selects a group head, and allows the group head to be used as a representative group in such a manner that the group head can communicate with the BS.

In accordance with another aspect of the present invention, after the group head is selected from among M2M devices in an M2M network, a process and method for forming a group head and a group between M2M devices are disclosed.

Technical Solution

The object of the present invention can be achieved by providing a group-based M2M (Machine to Machine) communication method of performing with a base station, as a representative of a M2M communication device group, a specific M2M communication device and other M2M communication devices are included in the M2M communication device group includes: performing an initial network entry procedure with the base station, wherein at least one of location information, battery information, and signal quality information of a specific M2M communication device is provided to the base station during the initial network entry procedure; and receiving a message indicating that the specific M2M communication device will be used as a representative of the M2M communication device group, from the base station, wherein the message includes a group ID (identifier) of the M2M communication device group and an ID of the specific M2M communication device, performing an uplink or downlink communication with the base station using the group ID as the representative of the M2M communication device group.

The message is transmitted by the base station in consideration of at least one of location information, battery information, and signal quality information of the specific M2M communication device and the other M2M communication devices.

The method may further include: receiving a join request message for the M2M communication device group from at least one of the other M2M communication devices; and transmitting a join acceptance message for the M2M communication device group as a response to the join request message.

The M2M communication device configured to transmit the join acceptance message for the M2M communication device group may perform homogeneous M2M communication with the specific M2M communication device.

The performing an initial network entry procedure further includes additionally informing the base station of an M2M communication type of the specific M2M communication device when performing the initial network entry procedure with the base station.

The method may further include: transmitting a request message for requesting which the specific M2M communication device want be a representative of the M2M communication device group, to the base station; and receiving a message indicating that the specific M2M communication device will be used as the representative of the M2M communication device group, from the base station as a response to the request message.

The method may further include: broadcasting an indication message indicating that the specific M2M communication device is a representative of the M2M communication device group, wherein the indication message includes at least one of an ID of the specific M2M communication device, the group ID, an M2M communication type of the group, and location information of the specific M2M communication device.

The method may further include, in response to the indication message, receiving a join request message from an M2M communication device having the same M2M communication type as an M2M communication type of the M2M communication device group, wherein the join request message includes an ID of the M2M communication device configured to transmit the join request message.

The method may further include: receiving a message indicating that the specific M2M communication device will be used as a representative of the M2M communication device group, from the base station, wherein the message further includes a list of candidate M2M communication devices to be contained in the M2M communication device group; and transmitting an indication message indicating that the specific M2M communication device is a representative of the M2M communication device group, to M2M communication devices contained in the list of the candidate M2M communication devices, wherein the indication message includes at least one of an ID of the specific M2M communication device, the group ID, an M2M communication type of the M2M communication device group, and location information of the specific M2M communication device.

In another aspect of the present invention, a group-based M2M communication method of performing with a base station, as a representative of a M2M communication device group, a plurality of M2M communications are included in the M2M (Machine to Machine) communication device group and a specific M2M device is used as a representative of the M2M communication device include: performing an initial network entry procedure with the base station, wherein at least one of location information, battery information, and signal quality information of an M2M communication device configured to perform the initial network entry procedure is provided to the base station during the initial network entry procedure; receiving an indication message including information of at least one candidate M2M communication device capable of being used as the representative of the M2M communication device group, from the base station, wherein the indication message includes a group ID of the M2M communication device group and a list of IDs of the candidate M2M communication devices; receiving, by the specific M2M device from the base station, a join request message for the M2M communication device group, wherein the specific M2M communication device is selected considering the list contained in the received indication message; and transmitting, by the specific M2M device to the base station, a join acceptance message for the M2M communication device group.

The method may further include: scanning the candidate M2M communication devices contained in the list; and selecting the specific M2M communication device according to the scanning result.

The received indication message may further include frequency information used for scanning the candidate M2M communication devices.

The method may further include: receiving a representative M2M communication device indication message indicating that an arbitrary M2M communication device is a representative of the M2M communication device group, from the arbitrary M2M communication device, wherein the representative M2M communication device indication message includes at least one of an ID of the arbitrary M2M communication device, a group ID of a group represented by the arbitrary M2M communication device, an M2M communication type of a group represented by the arbitrary M2M communication device, and location information of the arbitrary M2M communication device.

The method may further include: in consideration of the representative M2M communication device indication message, transmitting a join request message for an M2M communication device group represented by the arbitrary M2M communication device to the arbitrary M2M communication device.

The method may further include: if the M2M communication device secedes from the M2M communication device group represented by the specific M2M communication device, transmitting a deregistration request message to the specific M2M communication device.

In another aspect of the present invention, a Machine to Machine (M2M) communication device configured to perform group-based M2M communication includes: a transceiver configured to transmit/receive signals to/from a base station and other M2M communication devices; and a processor functionally connected to the transceiver in such a manner that the transceiver transmits/receives signals to/from the base station and the other M2M communication devices, wherein the processor performs an initial network entry procedure with the base station using the transceiver, wherein at least one of location information, battery information, and signal quality information of a specific M2M communication device is provided to the base station during the initial network entry procedure, and if the transceiver receives an indication message indicating a representative of the M2M communication device group from the base station, the processor extracts a group ID of the M2M communication device group and an ID of the specific M2M communication device, and performs uplink and downlink communication with the base station using the group ID used to identify a representative of the M2M communication device group.

If the transceiver receives an indication message including information of at least one M2M communication device capable of being used as a representative of the M2M communication device group from the base station, the processor extracts a group ID of the M2M communication device group and a list of IDs of the candidate M2M communication devices from the indication message. The processor transmits a join request message for the M2M communication device group represented by the specific M2M communication device to a specific M2M communication device selected considering the list contained in the received indication message using the transceiver, and receives a join acceptance message for the M2M communication device group represented by the specific M2M communication device from the specific M2M communication device.

Advantageous Effects

The above-mentioned embodiments form a group between M2M devices, select a group head, and allow the group head to be used as a representative group so as to communicate with the BS, resulting in load between the BS and the M2M devices.

DESCRIPTION OF DRAWINGS

The accompanying drawings, which are included to provide a further understanding of the invention, illustrate embodiments of the invention and together with the description serve to explain the principle of the invention.

BEST MODE

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be practiced without such specific details.

In some cases, in order to prevent ambiguity of the concepts of the present invention, conventional devices or apparatuses well known to those skilled in the art will be omitted and be denoted in the form of a block diagram on the basis of important functions of the present invention. Wherever possible, the same reference numbers will be used throughout the drawings to refer to the same or like parts.

Figure 1:
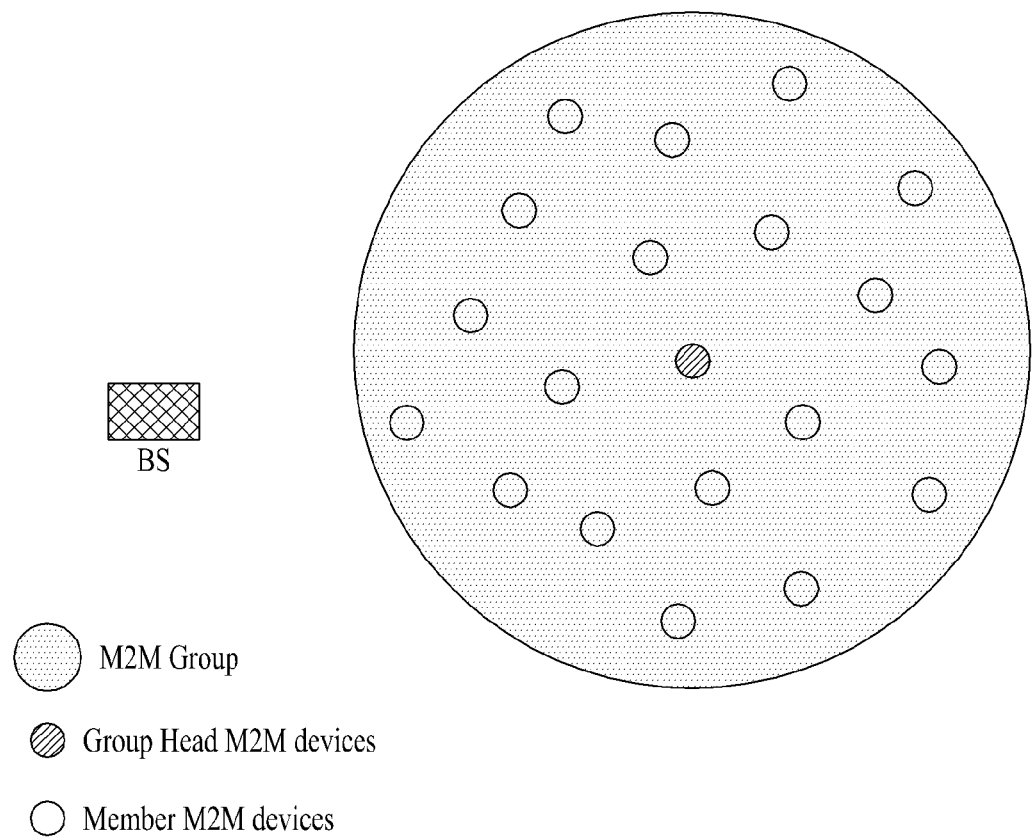
FIG. 1 is a conceptual diagram illustrating group-based M2M communication according to an embodiment of the present invention.

FIG. 1 is a conceptual diagram illustrating group-based M2M communication according to an embodiment of the present invention.

Devices performing communication according to an M2M scheme (which may be called M2M devices, M2M communication devices, Machine Type Communication (MTC) devices, etc.) will increase in number in a given network as machine application types thereof increase. Machine application types under consideration are (1) fleet management in Point Of Sale (POS)-related and security-related application markets; (2) communication between devices at a vending machine; (3) remote monitoring of machines and facilities and smart metering for automatically measuring the operation time of construction machines and facilities and heat or power consumption; and (4) surveillance video communication of a surveillance camera, which should not be construed as limiting the present invention. Besides, many other machine application types are being discussed. Thus, as the machine application types increase, the number of M2M communication devices may rapidly increase compared to the number of a general mobile communication devices. Accordingly, if each of the M2M devices individually communicates with a BS, a wireless interface may be subject to severe load, and the collision problem may increased according to the BS scheduling scheme.

In addition, the M2M communication technique has low mobility compared to the legacy mobile communication scheme. For example, the M2M device configured to implement smart meter reading (i.e., intelligent meter reading) used to automatically meter electricity consumption persistently and automatically measures (or meters) electricity consumption at the corresponding position at an initial installation position will periodically transmit the measured data to an M2M server configured to control automatic meter reading. If necessary, instead of periodically transmitting the measured data, even when a specific event occurs, the M2M device may also transmit data to the M2M server. Therefore, under the condition that the base station (BS) receives information indicating the change of a time period for automatically measuring electricity consumption or receives a message indicating the change of scheduling information of M2M devices from the M2M server, assuming that a group of M2M devices is formed and notified to a representative M2M device (hereinafter also referred to as a group head) of each group instead of transmitting the change of scheduling information to each M2M device, a load problem of a radio interface can be efficiently solved.

FIG. 1 is a conceptual diagram illustrating that a group is formed by selecting a group head in a network including M2M devices. The M2M device selected as a group head serves as a representative group, and can transmit and receive UL and/or DL signals to and from the base station (BS). In addition, the group head minimizes overhead by collecting signals (data) received from individual M2M devices, and reports the minimized overhead to the base station (BS), so that the base station (BS) can transmit the received information to the corresponding M2M server.

In accordance with an embodiment of the present invention, a method for selecting a group head as a representative group at a first step for forming a group between M2M devices in an M2M communication environment will hereinafter be described. In order to select a group head, two methods (i.e., a method for selecting a group head by an M2M device and a method for selecting a group head) may be used. Although the following description has disclosed an exemplary case in which the M2M communication scheme is combined with a mobile communication system based on IEEE 802.16m standard, the scope or spirit of the present invention is not limited thereto, and the M2M communication technique can be combined with various mobile communication techniques as necessary.

M2M Device-Initiated Group-Head Selection Method

A method for selecting a group head by procedure initiation of the M2M device according to an embodiment of the present invention will hereinafter be described.

Figure 2:
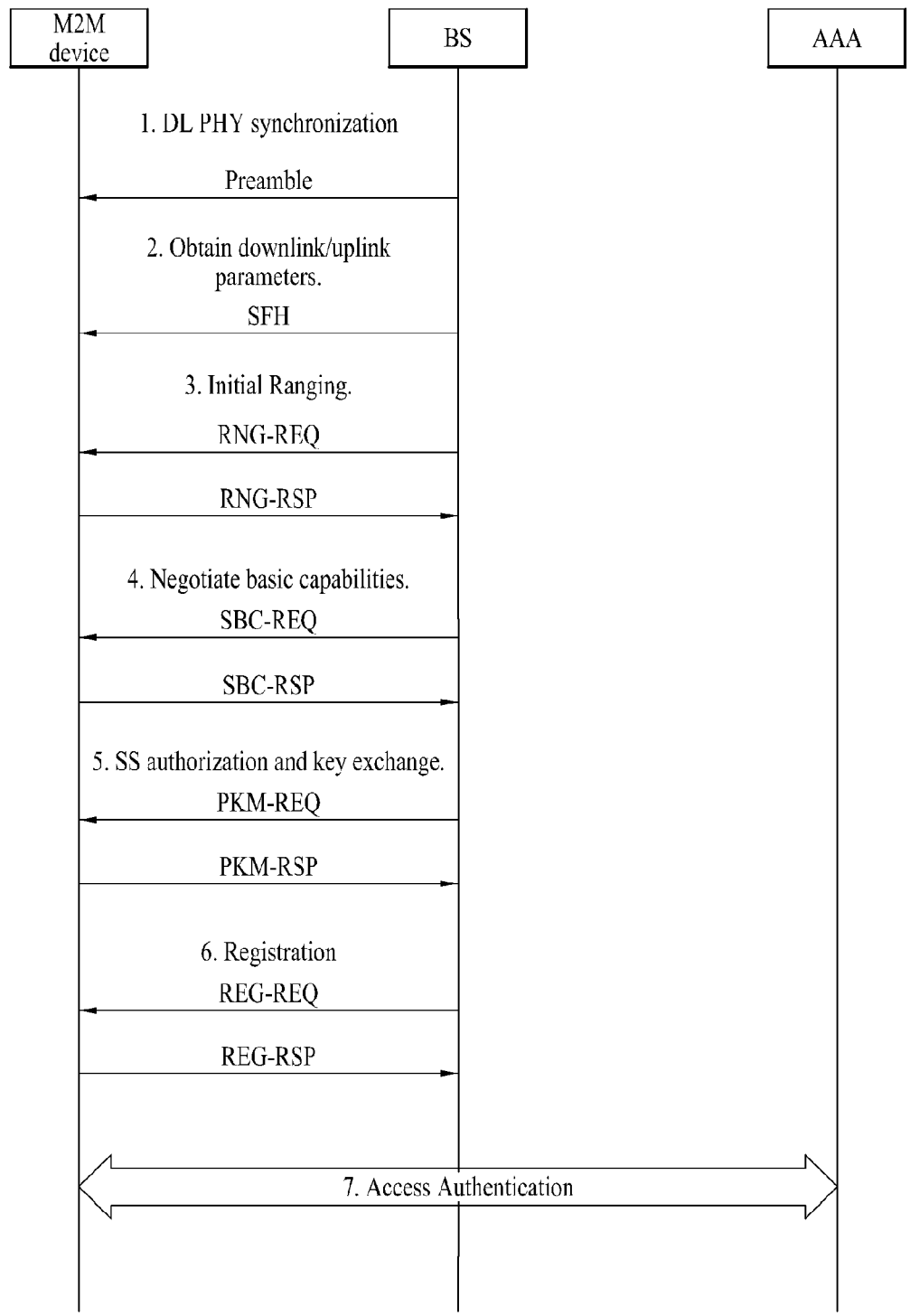
FIG. 2 is a conceptual diagram illustrating an initial network entry process between an M2M device and a BS according to an embodiment of the present invention.

FIG. 2 is a conceptual diagram illustrating an initial network entry procedure between an M2M device and a BS according to an embodiment of the present invention.

Referring to FIG. 2, the M2M device can obtain downlink synchronization upon receiving a DL PHY synchronization preamble from the BS (Step 1). The M2M device receives a system frame header (SFH) transmitted on downlink so that it can obtain DL/UL parameters (Step 2).

Thereafter, the M2M device can exchange initial RNG-REQ/RSP messages with the BS (Step 3). This embodiment proposes a method for using RNG-REQ/RSP messages including the following information in the initial ranging process.

TABLE 1

| Name | value | usage | |
|---|---|---|---|
| ~ | — | — | |
| M2M device location information indicator | '1' GPS information available '0' GPS information not available | | |
| M2M device location information | Location information: Latitude Longitude Or Other coordinate system MS Speed | Include when the M2M device location information indicator is '1' | |
| ~ | — | — | |

That is, the M2M device can inform the BS of M2M device location information in the initial network entry process, and can determine formation of a group of the M2M devices in consideration of the received location information.

FIG. 2 is a conceptual diagram illustrating that M2M device location information is informed to the BS in the initial ranging procedure. The above-mentioned M2M device location information may be added to a subsequent registration step.

Upon completion of the ranging process, the M2M device exchanges SBC-REQ/RSP messages with the BS in a negotiation procedure of basic capabilities (Step 4), and can perform an encryption key setting procedure (Step 5). Thereafter, the M2M device exchanges REG-REQ/RSP messages with the BS and can perform a network registration procedure (Step 6). One embodiment of the present invention proposes a method for informing the BS of an M2M device application type by the M2M device.

TABLE 2

| Name | value | Usage | |
|---|---|---|---|
| ~ | — | — | |
| Machine Application Type | 0: Fleet Management 1: Vending Machine 2: Smart Metering 3: Surveillance Video 4~xxx: Reserved | | |
| ~ | — | — | |

TABLE 3

| Name | value | Usage |
|---|---|---|
| ~ | — | — |
| Machine Application Type | 0: Fleet Management 1: Vending Machine 2: Smart Metering 3: Surveillance Video 4~xxx: Reserved | |
| DID (Device ID) | | DID (Device ID) is an ID that is allocated from a network in a registration procedure of a network entry. Network identifies M2M device through DID. |
| ~ | — | — |

Table 2 shows the AAI_REQ-REQ message as an example of a join request message. Table 3 shows the AAI_REQ-RSP message as an example of a join response message.

In more detail, although Tables 2 and 3 exemplarily show a variety of machine application types, for example, fleet management, communication between vending machines, smart meter, and surveillance video communication of a surveillance camera, the scope or spirit of the present invention can also be applied to other examples without any limitation. Table 3 shows the REG-RSP message in a device ID (DID) for identifying an M2M device in a network. That is, DID can be allocated to the M2M device through the network registration procedure. This DID can perform the same function as "Station ID" according to IEEE 802.16m standard.

Upon completion of the above-mentioned procedure, the M2M device can perform an authentication procedure with the BS (Step 7).

Figure 3:
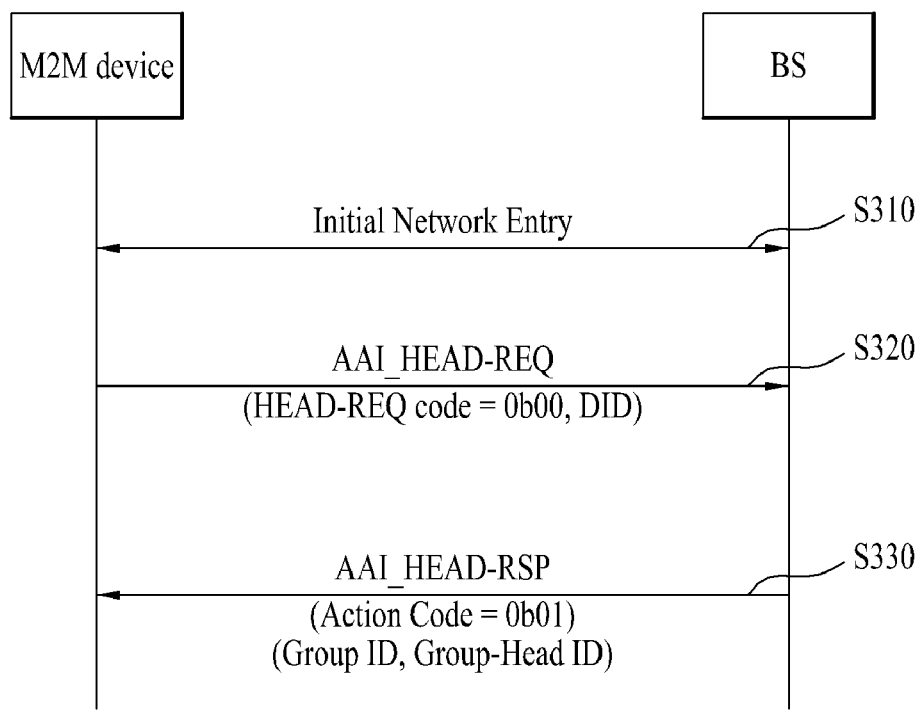
FIG. 3 is a flowchart illustrating an M2M device initiated group-head selection method according to an embodiment of the present invention.

FIG. 3 is a flowchart illustrating an M2M device initiated group-head selection method according to an embodiment of the present invention.

Referring to FIG. 3, the M2M device performs the initial network entry procedure with the BS in the same manner as in FIG. 2 (Step S310). If it is determined that the M2M device is appropriate for a group head, the M2M device transmits an AAI_HEAD-REQ message to the BS so that the M2M device can be selected as a group head (Step S320). The M2M device can be determined to be appropriate for a group head under the following conditions.

First condition: Enough battery lifetime of the device remains.

Second condition: RSSI (Received Signal Strength Indicator) and CINR (Carrier to Interference and Noise Ratio) are determined to be sufficiently good on the basis of transmission/reception signals related to the BS in the initial network entry procedure.

Third condition: A distance between the BS and the M2M device is determined to be sufficiently short (on the assumption that the location information of the M2M device equipped with a GPS and the BS location information are already known to the M2M device).

Other M2M devices can consider additional conditions for the above-mentioned conditions or other equivalent conditions.

Meanwhile, if it is determined that the requested M2M device is appropriate for a group head after receiving an AAI_HEAD-REQ message, the BS transmits an AAI-HEAD-RSP message to the M2M device so that it can inform the m2M device that the corresponding M2M device was selected as a group head (Step S330). In this case, the BS can consider a variety of information notified by the M2M device in the initial network entry procedure, for example, M2M device location information, battery information, signal quality information, machine application type, etc.

BS-Initiated Group-Head Selection Method

The following description discloses a BS initiated group-head selection method.

Figure 4:
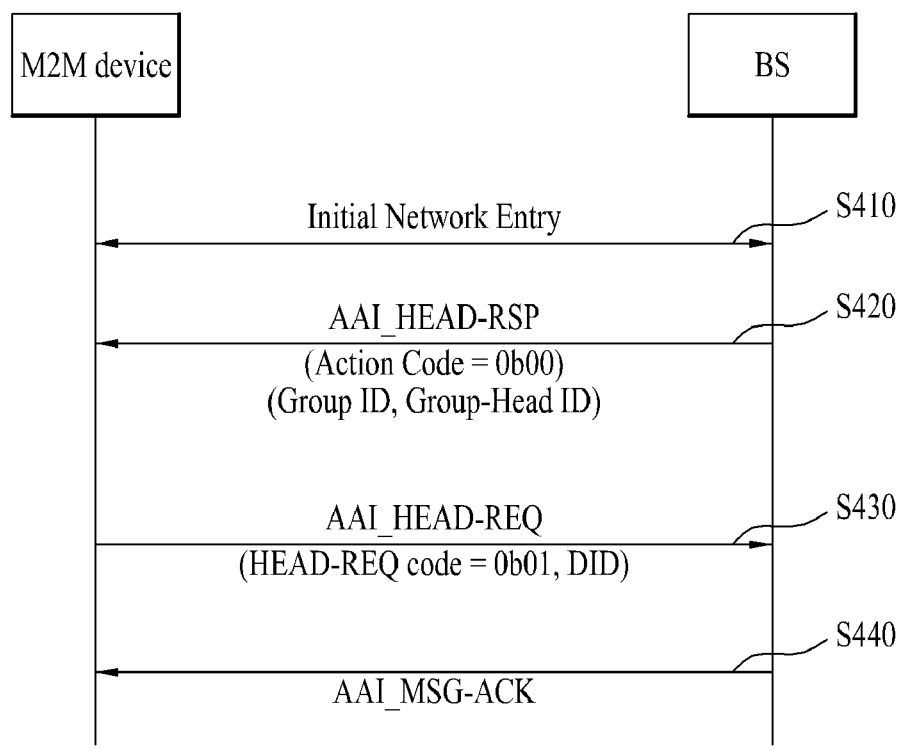
FIG. 4 is a flowchart illustrating a BS initiated group-head selection method according to an embodiment of the present invention.

FIG. 4 is a flowchart illustrating a BS initiated group-head selection method according to an embodiment of the present invention.

Referring to FIG. 4, the M2M device can perform the initial network entry procedure in step S410, as previously stated in FIG. 2.

Then the BS selects a group head from among M2M devices attached thereto (i.e., M2M devices having entered the network), so that it can inform the corresponding M2M device of the selected group head. The BS can determine the M2M device to be appropriate for the group head under the following conditions.

First condition: In case of using a device having enough battery lifetime.

Second condition: In case of using a device in which RSSI and CINR are determined to be sufficiently good on the basis of transmission/reception signals related to the M2M device in the initial network entry procedure.

Third condition: In case of using a device in which a distance between the BS and one the M2M device is determined to be sufficiently short (on the assumption that the location information of the M2M device equipped with a GPS and the BS location information are already known to the M2M device).

Others

The BS can transmit an AAI_HEAD-RSP message including a group ID and a group-head ID to a device selected as a group head in step S420. An example of the AAI_HEAD-RSP message may include the following structure shown in Table 4.

TABLE 4

| Syntax | Size (bit) | Notes | |
|---|---|---|---|
| AAI_HEAD-RSP_Message_format( ) { | — | — | |
| Action Code | | Used to indicate the purpose of this message<br>0b00: M2M device shall begin Group-Head initiation (signal M2M device to begin Group-Head initiation in unsolicited manner<br>0b01: This option is valid only in response to a AAI_HEAD-REQ message with HEAD-REQ Code 0b00(to allow M2M device-initiated Group-Head request)<br>0b10: This option is valid only in response to a AAI_HEAD-REQ message with HEAD-REQ Code 0b00(to reject M2M device-initiated Group-Head request)<br>0b11: reserved | |
| Group-Head ID | | Used to indicate Group-Head ID used to identify Group-Head in Network | |
| Group ID | | Used to indicate Group ID used to identify M2M Group in Network | |
| } | — | — | |

As shown in Table 4, the action codes include a first action code "0b00", a second action code "0b01", and a third action code "0b10". In more detail, the action code "0b00" indicates that the BS first transmits the AAI_HEAD-RSP message to the M2M device according to the BS initiated group-head selection scheme, and indicates that the M2M device will be initiated as a group head. The action code "0b01" indicates a response message for accepting an M2M device operated as a group head in response to an M2M device group-head selection request according to the M2M device initiated group-head selection scheme. The action code "0b10" indicates a response message for rejecting an M2M device operated as a group head in response to a request of the M2M device. FIG. 4 shows that the BS transmits the AAI_HEAD-RSP message including the action code "0b00" to the M2M device. In addition, the AAI_HEAD-RSP message may include a group ID and an ID of the M2M device selected as a group head.

In the meantime, the M2M device having received the AAI_HEAD-RSP message can transmit the AAI_HEAD-REQ message to the BS in step S430. The AAI_HEAD-REQ message may include the following structure.

TABLE 5

| Syntax | Size (bit) | Notes |
|---|---|---|
| AAI_HEAD-REQ_Message_format( ) {<br>HEAD_REQ Code | — | —<br>Used to indicate the purpose of this message<br>0b00: M2M device initiated Group-Head request<br>0b01: Response (accept) for the unsolicited AAI_HEAD-RSP message with action code 0x00 by the ABS.<br>0b10: reject for the unsolicited AAI_DREG-RSP message with action code 0x00 by the ABS.<br>0x11: reserved |
| DID (Device ID) | | DID (Device ID) is an ID that is allocated from a network in a network entry registration procedure. The network identifies the M2M device through the DID. |
| } | — | — |

As shown in Table 5, the action codes of the AAI_HEAD-REQ message includes a first action code "0b00", a second action code "0b01", and a third action code "0b10". The action code "0b00" indicates that the corresponding AAI_HEAD-REQ message is an M2M initiated group-head selection request message. The action code "0b01" indicates an acceptance message of the BS initiated group-head selection. The action code "0b10" indicates a rejection message of the BS initiated group-head selection. In the example of FIG. 4, it is assumed that the AAI_HEAD-REQ message corresponding to the action code "0b01" is transmitted to the BS. In addition, if it is determined that the M2M device is appropriate for the group head, the M2M device can transmit the AAI_HEAD-REQ (HEAD-REQ code=0b01) message including its own DID to the BS.

As a response to the AAI_HEAD-REQ message, the BS can transmit an ACK message to the M2M device in step S440. The M2M device having successfully received an MSG-ACK serves as a representative of the corresponding group, so that it can perform UL/DL communication with the BS.

On the other hand, a method for allowing the M2M device not selected as a group head to select a group head and join the selected group head in the corresponding M2M device group will hereinafter be described with reference to the attached drawings.

Group-Head Selection and Group Join Procedure

Figure 5:
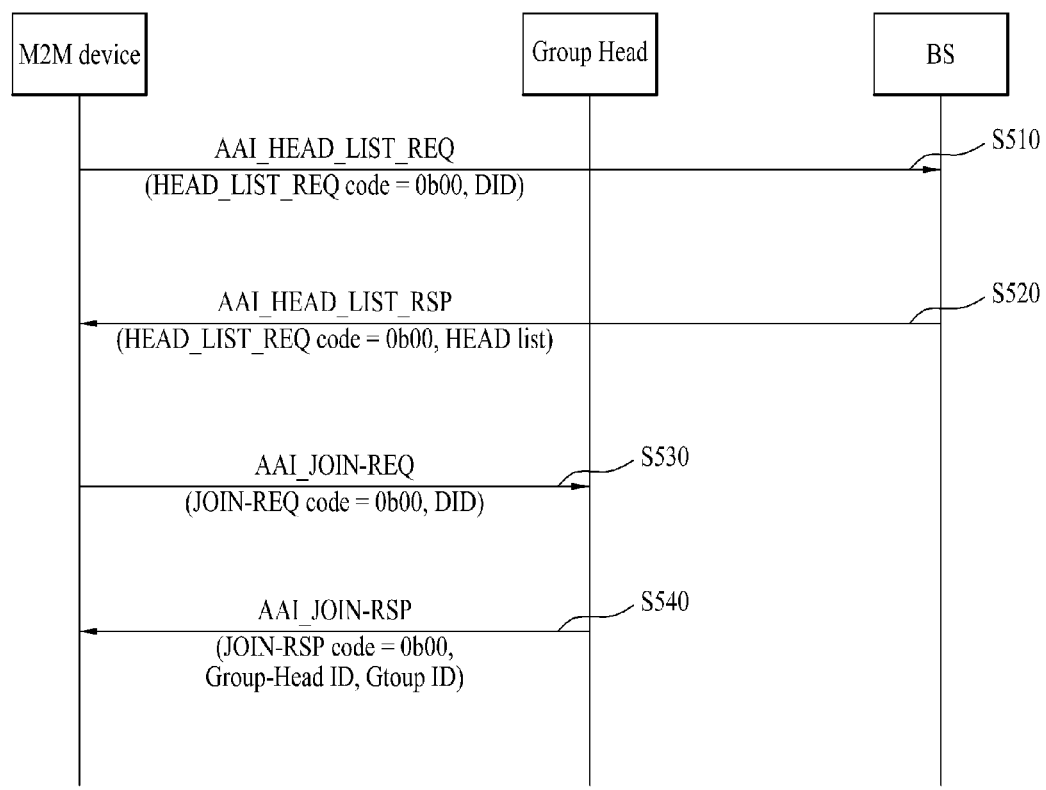
FIG. 5 is a flowchart illustrating a method for receiving candidate group head list information from a base station so as to join the corresponding M2M group.

FIG. 5 is a flowchart illustrating a method for receiving candidate group head list information form a base station (BS) so as to join the corresponding M2M group.

Referring to FIG. 5, if an appropriate group-head device is not present in a peripheral part of the M2M device, the M2M device transmits an AAI_HEAD-LIST-REQ message to the BS so as to query the BS for the presence or absence of a group head in a peripheral part of the BS in step S510, and then receives a list of group heads from the BS upon receiving an AAI_HEAD-LIST-RSP message from the BS in step S520. Although not shown in FIG. 5, through the AAI_HEAD-LIST-REQ message, the BS can provide the M2M device with a list of candidate group heads appropriate for the location of the corresponding M2M device on the basis of specific information. Here, the specific information was sent to the BS in the initial network entry procedure by the M2M device having requested group head information through the AAI_HEAD-LIST-REQ message.

The M2M device having received the AAI_HEAD_LIST-RSP message confirms a group head list contained in the message, and determines a group head in which the M2M device will join. The M2M device having determined the group head transmits the AAI_JOIN-REQ message to the determined group-head M2M device, so that it can transmit a join request (AAI_JOIN-REQ) to the group-head device in step S530. The group-head device having received the AAI_JOIN-REQ message transmits the AAI_JOIN-RSP message to the M2M device, so that the group-head device can allow the M2M device to join as a group member in step S540.

On the other hand, according to another embodiment of the present invention, the M2M device can join the group head as a member by exchanging the same message with the group head, but the BS may also directly provide a group head ID of a group in which the corresponding M2M device will join when transmitting the AAI_HEAD_LIST_RSP message. If the BS transmits the AAI_HEAD_LIST_RSP message to the M2M device so that it informs the M2M device of an ID of a group head in which the M2M device will directly join, the M2M device having received the AAI_HEAD_LIST_RSP message transmits the AAI_JOIN-REQ message to the indicated group-head M2M device so that it can perform subsequent procedures.

Figure 6:
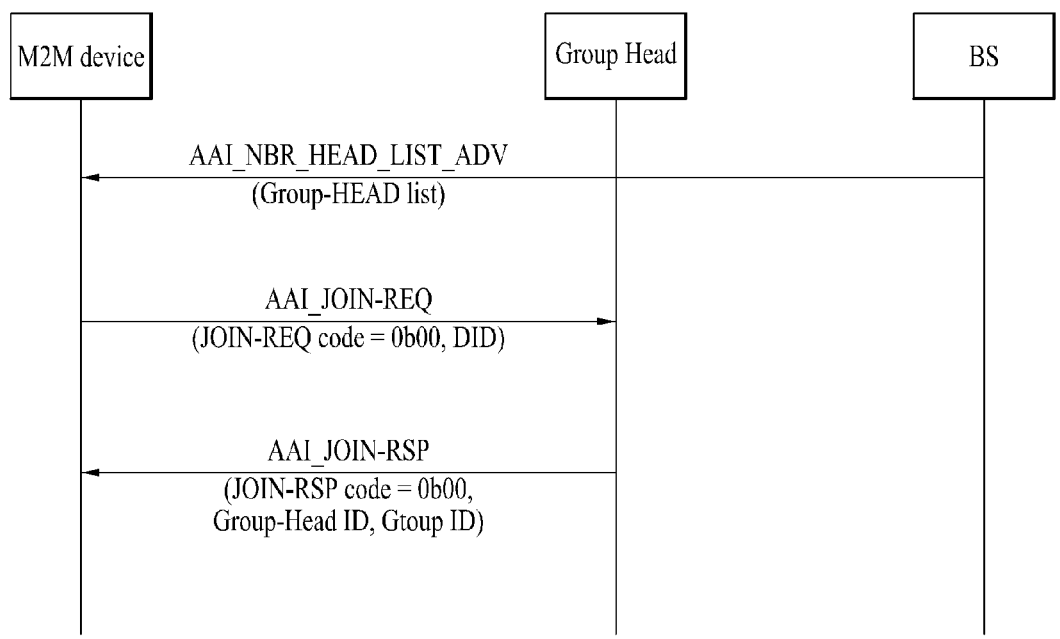
FIG. 6 is a flowchart illustrating a method for enabling a base station (BS) to periodically broadcast the list of candidate group head M2M devices to M2M devices according to an embodiment of the present invention.

FIG. 6 is a flowchart illustrating a method for enabling a base station (BS) to periodically broadcast the list of candidate group head M2M devices to M2M devices according to an embodiment of the present invention.

That is, differently from the example of FIG. 5, FIG. 6 shows that the BS can periodically broadcast M2M group head information present in its own region to the M2M devices through the AAI_NBR_HEAD_LIST-ADV message. The M2M device having received the AAI_NBR_HEAD_LIST-ADV message confirms a group head list contained in the message, and can determine a group head in which the M2M device will join. The M2M device having determined the group head transmits an AAI_JOIN-REQ message to the determined head M2M device so as to join an M2M group. The group head device having received the AAI_JOIN-REQ message transmits the AAI_JOIN-RSP message to the M2M device so that the M2M device can join the M2M group as a member.

Scanning Based Group-Head Selection

Another embodiment of the present invention proposes a method for allowing an M2M device to perform scanning based group-head selection. Here, the M2M device will join the group head. The M2M device can select a group head on the basis of an RSSI of a candidate group head upon receiving information from the BS.

Figure 7:
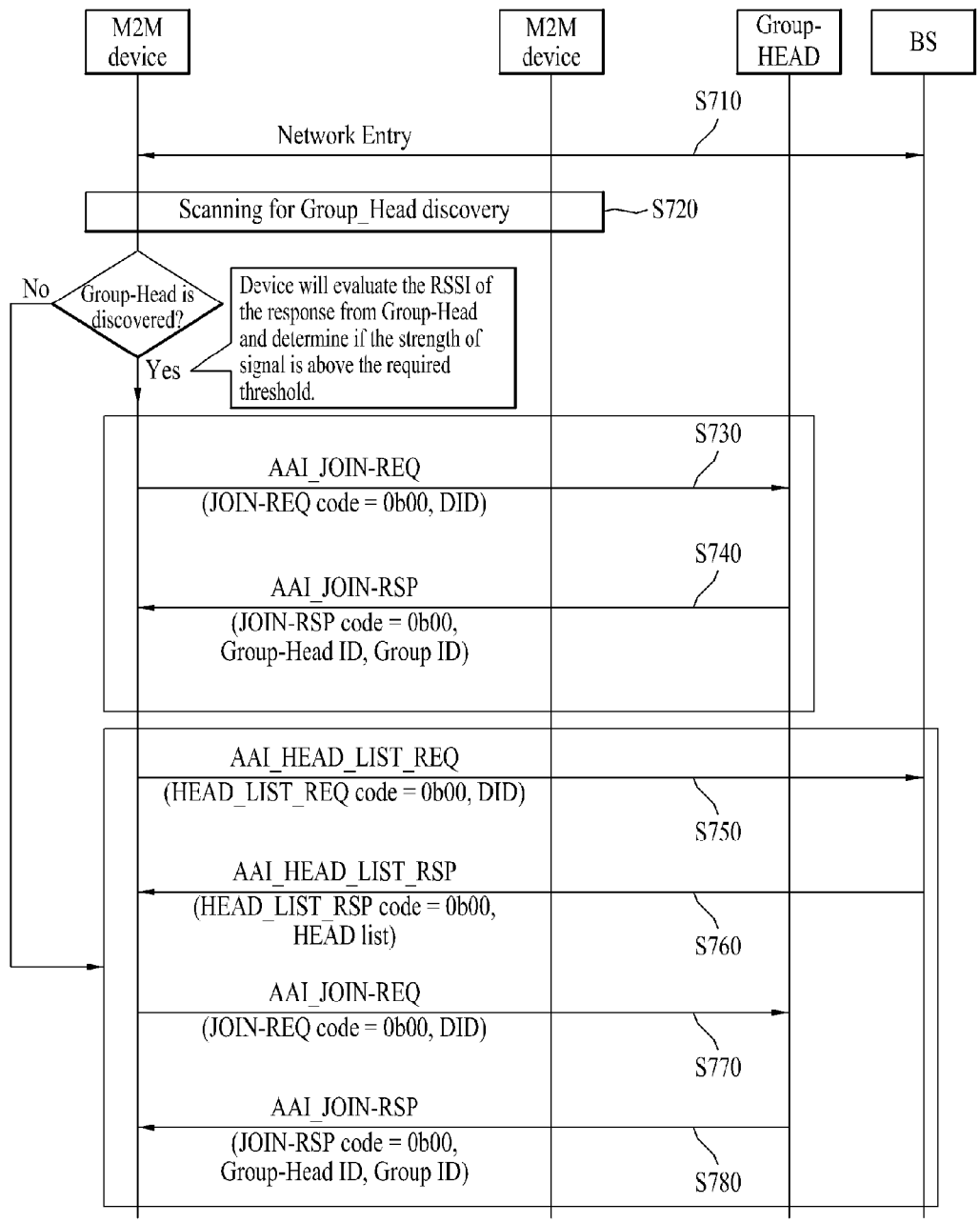
FIG. 7 is a flowchart illustrating a method for enabling the M2M device to select a group head on the basis of the scanning result according to an embodiment of the present invention.

FIG. 7 is a flowchart illustrating a method for enabling the M2M device to select a group head on the basis of the scanning result according to an embodiment of the present invention.

Referring to FIG. 7, the M2M device can perform the network entry procedure with the BS in step S710, and can search for an objective head device in which the M2M device will join through scanning in step S720. The M2M device determines a specific head device selected from among the scanned head devices (each of which has an RSSI equal to or higher than a predetermined threshold value) to be a group head, and transmits a join request (AAI_JOIN-REQ) message to the determined group head in step S730. In step S730, the selected head device has the same machine application type and the best RSSI value. The M2M device can receive an AAI_JOIN-RSP message answering the AAI_JOIN-REQ message from the group head in step S740. In accordance with the embodiment, the AAI_JOIN-REQ message and the AAI_JOIN-RSP message have the following structures shown in Tables 6 and 7.

TABLE 6

| Syntax | Size (bit) | Notes | |
| --- | --- | --- | --- |
| AAI_JOIN-REQ_Message_format( ) { | — | — | |
| JOIN_REQ Code | | Used to indicate the purpose of this message | |
| | | 0b00: Group-Join request | |
| | | 0b01~0b11: reserved | |
| } | — | — | |

TABLE 7

| Syntax | Size (bit) | Notes |
|---|---|---|
| AAI_JOIN-RSP_Message_format( ) { | | |
| Join-RSP Code | | Used to indicate the purpose of this message<br>0b00: This option is valid only in response to a AAI_JOIN-REQ message with JOIN-REQ Code 0b00(to allow Group-Join request)<br>0b01~0b11: reserved |
| Group-Head ID | | Used to indicate Group-Head ID used to identify Group-Head in Network |
| Group ID | | Used to indicate Group ID used to identify M2M Group in Network |
| } | | |

On the other hand, if a group head device appropriate for the M2M device scanning process is not found, the corresponding M2M device requests a group head list from the BS so that it can perform group head selection in steps S750 to S780. In this case, this embodiment of the present invention provides frequency information of a candidate group head in such a manner that the M2M device can select an objective group head through correct scanning. For this purpose, an AAI_HEAD-LIST-REQ message has the following structure shown in Table 8, and an AAI_HEAD_LIST-RSP message has the following structure shown in Table 9.

TABLE 8

| Syntax | Size (bit) | Notes |
|---|---|---|
| AAI_HEAD_LIST-REQ_Message_format( ) { | | |
| Frame number | | This indicates the least significant 4 bits of frame number in which the AMS expected to receive the AAI_HEAD_LIST-RSP |
| } | | |

TABLE 9

| Syntax | Size (bit) | Notes |
|---|---|---|
| AAI_HEAD_LIST-RSP_Message_format( ) { | | |
| Num_HEAD | | Number of HEAD device |
| For (i = 0; i<Num_HEAD; i++) { | | |
| Group-Head ID (the same concept as BS ID) | | Used to indicate Group-Head ID used to identify Group-Head in Network |
| Group ID | | Used to indicate Group ID used to identify M2M Group in Network |
| Preamble index | | Preamble index of Group HEAD to be scanned |
| Center frequency | | center frequency (in unit of Hz) |
| Scan Duration | | Duration for scanning indicated group head devices |
| Start frame index | | Frame where scanning begins |
| } | | |
| } | | |

Meanwhile, another embodiment of the present invention selects a group head based on M2M device scanning in a similar way to the scheme shown in FIG. 7, and controls the BS to periodically broadcast an advertisement (ADV) message needed for M2M device scanning without receiving a request from the M2M device, so that the M2M device can perform scanning and can select a group head on the basis of the scanning result. An AAI_NBR_HEAD_LIST-ADV message according to this embodiment may have the following structure shown in Table 10.

TABLE 10

| Syntax | Size (bit) | Notes |
|---|---|---|
| AAI_NBR_HEAD_LIST-ADV_Message_format( ) { | | |
| Num_BS | | Number of neighbor BS |

TABLE 10-continued

| Syntax | Size (bit) | Notes |
|---|---|---|
| Num_HEAD | | Number of HEAD device |
| for (i = 0: i<Num_BS; i++) { | | |
|     for (j = 0: j<Num_HEAD; j++) { | | |
| Group-Head ID | | Used to indicate Group-Head ID used to identify Group-Head in Network |
| Group ID | | Used to indicate Group ID used to identify M2M Group in Network |
| Preamble index | | Preamble index of Group HEAD device to be scanned |
| Center frequency | | center frequency (in unit of Hz) |
| Scan Duration | | Duration for scanning indicated group head devices |
| Start frame index | | Frame where scanning begins |
|     } | | |
|   } | | |
| } | — | — |

The following description will disclose a procedure and method for forming a group between a group head and M2M devices after the group head has been selected from among M2M devices in the M2M network.

Figure 8:
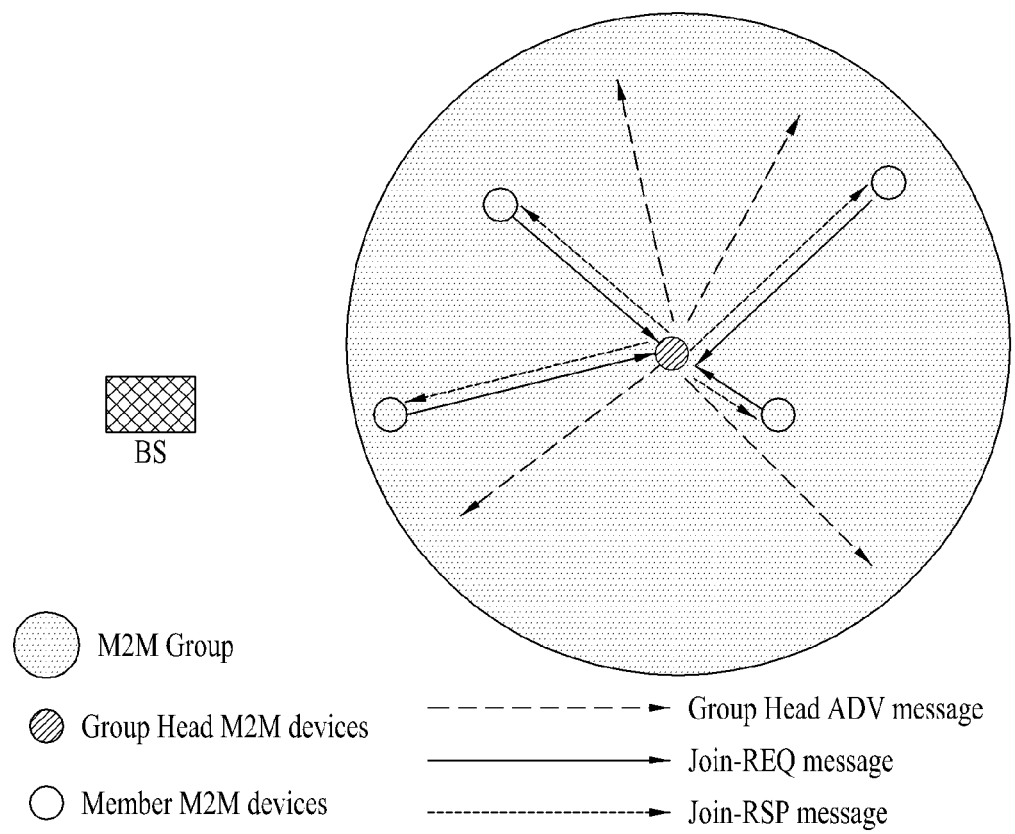
FIG. 8 is a diagram illustrating the concept of how to construct a group after a group head is selected from among M2M devices according to an embodiment of the present invention.

FIG. 8 is a diagram illustrating the concept of how to construct a group after a group head is selected from among M2M devices according to an embodiment of the present invention.

Referring to FIG. 8, the M2M device selected as a group head indicates that the M2M device was selected as a group head through a group head ADV message, or can broadcast an AAI_GH-ADV message at a predetermined power level so that it can receive a group join request from general M2M devices. Since the group head is unable to receive each M2M device as a member without limitation, it can adjust power in such a manner that only M2M devices present in a predetermined region can receive the AAI_GH-ADV message. In accordance with this embodiment, the AAI_GH-ADV message broadcast by the group head may have the following structure shown in Table 11.

invite other M2M devices to join an M2M group, the M2M device selected as a group head may include its own device ID (DID), group-head indication information indicting inclusion or non-inclusion of a group head, a group head ID, a group ID, a machine application type, and M2M device location information, and then broadcast them.

Figure 9:
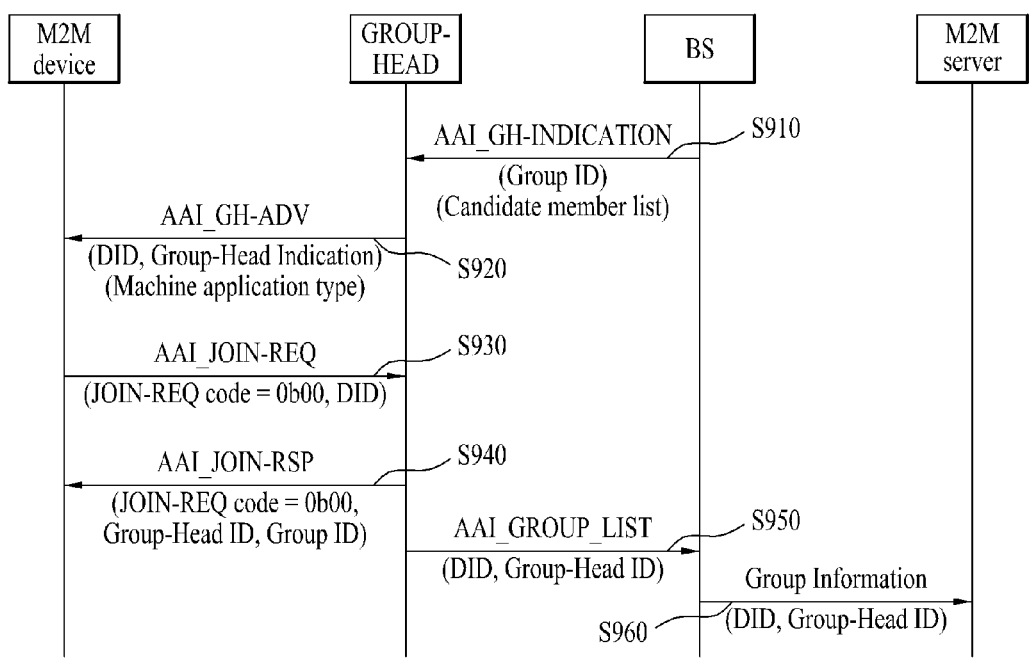
FIG. 9 is a flowchart illustrating a method for allowing a group head to transmit a group head advertisement (ADV) message to predetermined candidate M2M devices according to an embodiment of the present invention.

In accordance with another method for allowing the group head to the AAI_GH-ADV message, the group head may transmit the AAI_GH-ADV message to candidate devices by referring to a candidate member list contained in the AAI_GH-INDICATION message, as shown in FIG. 9.

FIG. 9 is a flowchart illustrating a method for allowing a group head to transmit a group head advertisement (ADV) message to predetermined candidate M2M devices according to an embodiment of the present invention.

This embodiment shown in FIG. 9 can further include a corresponding group ID, a group head ID, and a list of candidate members in the AAI_GH-INDICATION message through which the BS can select a specific M2M device as a

TABLE 11

| Syntax | Size (bit) | Notes |
|---|---|---|
| AAI_GH-ADV_Message_format( ) { | — | — |
| DID (Device ID) | | DID is an ID allocated from a network in a network entry registration process. The network identifies an M2M device through a DID. |
| Group-Head Indication | | Used to indicate Group-Head<br>0: This device is not Group-Head<br>1: This device is Group-Head |
| Group-Head ID | | Used to indicate Group-Head ID used to identify Group-Head in Network |
| Group ID | | Used to indicate Group ID used to identify M2M Group in Network |
| Machine Application Type | | 0: Fleet Management<br>1: Vending Machine<br>2: Smart Metering<br>3: Surveillance Video<br>4~xxx: Reserved |
| M2M device location information | | Location information:<br>Latitude<br>Longitude<br>Or Other coordinate system<br>MS Speed |
| } | — | — |

Table 11 shows an example of an AAI_GH-ADV message format that is transmitted from a group head device to each M2M device not used as a group head. That is, in order to group head (Step S910). The AAI_GH-INDICATION message shown in FIG. 9 may have the following structure shown in Table 12.

TABLE 12

| Syntax | Size (bit) | Notes |
|---|---|---|
| AAI_GH-INDICATION_Message_format( ) { | — | — |
| Group ID | | Used to indicate Group ID used to identify M2M Group in Network |
| Machine Application Type | | 0: Fleet Management<br>1: Vending Machine<br>2: Smart Metering<br>3: Surveillance Video<br>4~xxx: Reserved |
| Num_Candidate_Member_Devices | | Number of candidate member devices<br>Group-Head transmits the AAI_JOIN-REQ message to the candidate member device so that it can invite the candidate member device to join a group |
| for (i=0; i< Num_Candidate_Member_Devices; i++) { | | |
| DID (Device ID) | | DID is an ID allocated from a network in a network entry registration procedure. The network identifies an M2M device through a DID. |
| Machine Application Type | | 0: Fleet Management<br>1: Vending Machine<br>2: Smart Metering<br>3: Surveillance Video<br>4~xxx: Reserved |
| M2M device location information | | Location information:<br>Latitude<br>Longitude<br>Or Other coordinate system<br>MS Speed |
| }<br>} | — | — |

Meanwhile, differently from the embodiment of FIG. 8, the group head having received the AAI_GN-INDICATION message transmits an AAI_GH-ADV message including the structure of Table 11 to M2M devices contained in the received candidate member list in step S920.

The M2M devices having received the AAI_GH-ADV message that has been broadcast from the group head can determine whether or not each of the M2M devices will register (or join) as a member. Each M2M device having determined such registration transmits an AAI_JOIN-REQ message acting as a registration request message to the group head, so that it can join the group as a member in step S930. The M2M devices can decide to join the group under the following conditions.

- The same machine application type
- Group-head location information
- Channel quality (RSSI, CINR) between group head and each M2M device
- Others An example of the AAI_JOIN-REQ message may include the following structure shown in Table 13.

TABLE 13

| Syntax | Size (bit) | Notes |
|---|---|---|
| AAI_JOIN-REQ_Message_format( ) { | — | — |
| JOIN_REQ_Code | | Used to indicate the purpose of this message<br>0b00: Group-Join request<br>0b01~0b11: reserved |
| DID (Device ID) | | DID (Device ID) is an ID that is allocated from a network in a network entry registration procedure. The network identifies the M2M device through the DID. |
| } | — | — |

On the other hand, if the group head having received the AAI_JOIN-REQ message accepts the corresponding M2M device as a group member, it can transmit the AAI_JOIN-RSP message to the M2M device having transmitted the AAI_JOIN-REQ message in step S930. An example of a group join acceptance message (AAI_JOIN-RSP message) according to the embodiment of the present invention may have the following structure shown in Table 14.

TABLE 14

| Syntax | Size (bit) | Notes |
|---|---|---|
| AAI_JOIN-RSP_Message_format( ) { | — | — |
| Join-RSP Code | | Used to indicate the purpose of this message<br>0b00: This option is valid only in response to a AAI_JOIN-REQ message with |JOIN-REQ Code 0b00(to allow Group-Join request)<br>0b01~0b11: reserved |
| Group-Head ID | | Used to indicate Group-Head ID used to identify Group-Head in Network |
| Group ID | | Used to indicate Group ID used to identify M2M Group in Network |
| } | — | — |

After forming a group, the group head can transmit group information including a group-head ID and a device ID (DID) to the BS through an AAI_GROUP-LIST message in step S940. The AAI_GROUP-LIST message according to the embodiment of the present invention may have the following structure shown in Table 15.

TABLE 15

| Syntax | Size (bit) | Notes |
|---|---|---|
| AAI_GROUP-LIST_Message_format( ) { | — | — |
| Group Application Type (indication of applicaiton type serviced by group) | | 0: Fleet Management<br>1: Vending Machine<br>2: Smart Metering<br>3: Surveillance Video<br>4~xxx: Reserved |
| Group ID | | Used to indicate Group ID used to identify M2M Group in Network |
| Group-Head ID | | Used to indicate Group-Head ID used to identify Group-Head in Network |
| Num_Devices | | Number of member devices |
| for (i=0; i<Num_devices; i++) { | | |
| DID (Device ID) | | DID is an ID allocated from a network in a network entry registration procedure. The network can identify an M2M device through a DID. |
| Machine Application Type | | 0: Fleet Management<br>1: Vending Machine<br>2: Smart Metering<br>3: Surveillance Video<br>4~xxx: Reserved |
| M2M device location information | | Location information:<br>Latitude<br>Longitude<br>Or Other coordinate system<br>MS Speed |
| } | | |
| } | — | — |

In addition, the BS having received the AAI_GROUP-LIST message can transmit the resultant group information to the corresponding M2M server in step S950.

Figure 10:
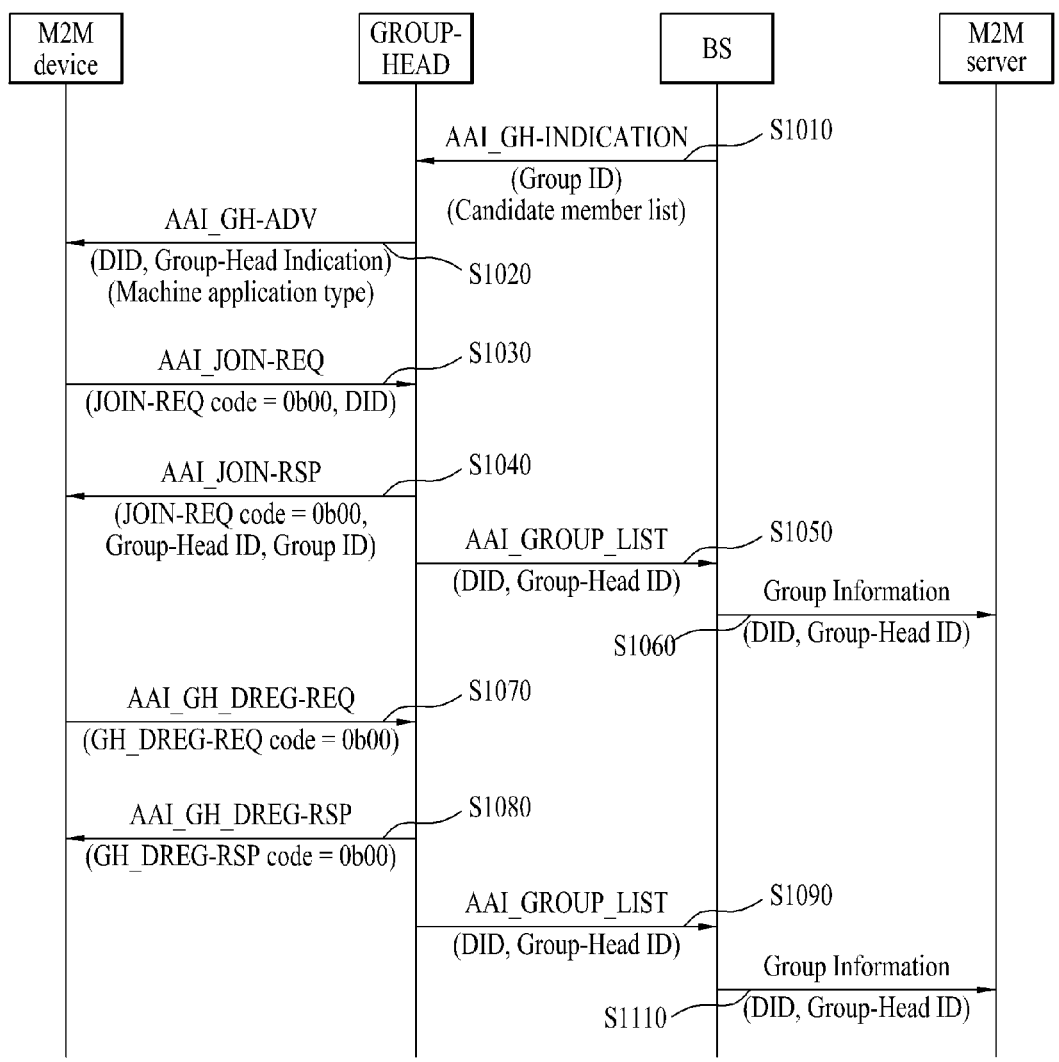
FIG. 10 is a flowchart illustrating a method for allowing a member M2M device to secede from a group according to an embodiment of the present invention.

FIG. 10 is a flowchart illustrating a method for allowing a member M2M device to secede from a group according to an embodiment of the present invention.

Steps S1010 to S1060 of FIG. 10 are substantially identical to steps S920 to S960 of FIG. 9.

However, this embodiment indicates that a group-joined member node can secede from the group through a DREG-REQ message. In more detail, if a member M2M device wants to secede from the group, it can transmit an AAI_GH_DREG-REQ message to the group head in step S1070. The AAI_GH_DREG-REQ message according to this embodiment may have the following structure.

TABLE 16

| Syntax | Size (bit) | Notes |
|---|---|---|
| AAI_GH_DREG-REQ_Message_format( ) { | — | — |
| GH_DREG_REQ Code | | Used to indicate the purpose of this message<br>0b00: Group- withdrawal request<br>0b01~0b11: reserved |

TABLE 16-continued

| Syntax | Size (bit) | Notes |
|---|---|---|
| DID (Device ID) | | DID is an ID allocated from a network in a network entry registration procedure. The network identifies an M2M device through a DID. |
| } | — | — |

On the other hand, the group head having received the AAI_GH-DREG-REQ message can transmit an AAI_GH_DREG-RSP message serving as a group-head deregistration response message to the corresponding M2M device in step S1080. The AAI_GH_DREG-RSP message according to this embodiment may have the following structure shown in Table 17.

TABLE 17

| Syntax | Size (bit) | Notes | |
|---|---|---|---|
| AAI_GH_DREG-RSP_Message_format( ) { | — | — | |
| GH_DREG-RSP Code | | Used to indicate the purpose of this message. 0b00: This option is valid only in response to a AAI_GH_DREG-REQ message with GH_DREG-REQ Code 0b00(to allow Group-withdrawal request) 0b01~0b11: reserved | |
| } | — | — | |

On the other hand, if a member M2M device secedes from the group as described above, the group head can transmit an AAI_GROUP-LIST message serving as updated group list information to the BS in step S1090. The BS having received the AAI_GROUP-LIST message can transmit the corresponding list to the M2M server in step S1100.

In the same manner as in the aforementioned deregistration, the group head can transmit the updated group list information to the BS even when a new member device is registered through AAI-JOIN-REQ/RSP messages.

Device Structure

Figure 11:
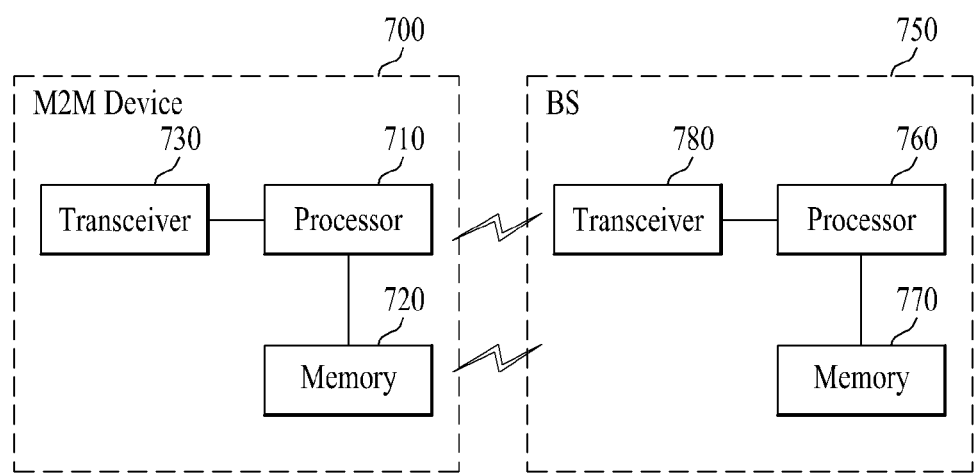
FIG. 11 is a block diagram illustrating an M2M device and a base station (BS) according to an embodiment of the present invention.

FIG. 11 is a block diagram illustrating an M2M device and a base station (BS) according to an embodiment of the present invention.

Referring to FIG. 11, an M2M device 700 may selectively include a transceiver 730, a processor 710, and a memory 720; and a base station (BS) 750 may selectively include a transceiver 780, a processor 760, and a memory 770. In the case of the M2M device 700, the transceiver 730 may be configured to communicate with the BS 750 and other M2M devices, the processor 710 may be functionally connected to the transceiver 730, and the transceiver 730 may communicate with other devices as necessary. If necessary, the processor 710 may store information contained in the exchanged message in the memory 720. The M2M device 700 can perform methods of the above-mentioned embodiments using the above-mentioned structures.

Although not shown in FIG. 11, the M2M device 700 may include a variety of additional structures according to machine application types. If the corresponding M2M device 700 is used for smart metering, the corresponding M2M device 700 may include an additional structure for power metering or the like. The above-mentioned power metering operation may be controlled by the processor 710 shown in FIG. 11, or may be controlled by a separately configured processor (not shown).

Although FIG. 11 exemplarily illustrates communication between the M2M device 700 and the BS 750, the M2M communication method according to the present invention may also be generated in M2M devices, and each M2M device can perform the methods of the above-mentioned embodiments using the same format as in each device shown in FIG. 11.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other. Accordingly, the invention should not be limited to the specific embodiments described herein, but should be accorded the broadest scope consistent with the principles and novel features disclosed herein.

INDUSTRIAL APPLICABILITY

Although the above-mentioned embodiments have been disclosed on the basis of only the IEEE 802.16 based system for convenience of description, the scope or spirit of the present invention is not limited thereto. That is, the above-mentioned embodiments can also be applied to other mobile communication systems according to the same principles as those of the IEEE 802.16 based system.

In addition, the above-mentioned embodiments can also be used to smart metering or the like belonging to the smart grid technology.

The invention claimed is:

1. A group-based M2M communication method of performing with a base station, as a representative of a M2M communication device group, a specific M2M communication device and other M2M communication devices are included in the M2M communication device group, the method comprising:

performing an initial network entry procedure with the base station, wherein at least one of location information, battery information, and signal quality information of a specific M2M communication device is provided to the base station during the initial network entry procedure; and receiving a message indicating that the specific M2M communication device will be used as a representative of the M2M communication device group, from the base station, wherein the message includes a group ID (identifier) of the M2M communication device group, an ID of the specific M2M communication device and a list of candidate M2M communication devices to be contained in the M2M communication device group, performing an uplink or downlink communication with the base station using the group ID as the representative of the M2M communication device group; and transmitting an indication message indicating that the specific M2M communication device is a representative of the M2M communication device group, to M2M communication devices contained in the list of the candidate M2M communication devices, wherein the indication message includes at least one of an ID of the specific M2M communication device, the group ID, an M2M communication type of the M2M communication device group, and location information of the specific M2M communication device.

2. The method according to claim 1, wherein the message is transmitted by the base station in consideration of at least one of location information, battery information, and signal quality information of the specific M2M communication device and the other M2M communication devices.

3. The method according to claim 1, further comprising:
receiving a join request message for the M2M communication device group from at least one of the other M2M communication devices; and
transmitting a join acceptance message for the M2M communication device group as a response to the join request message.

4. The method according to claim 3, wherein the M2M communication device configured to transmit the join acceptance message for the M2M communication device group performs homogeneous M2M communication with the specific M2M communication device.

5. The method according to claim 1, wherein the performing an initial network entry procedure further comprising additionally informing the base station of an M2M communication type of the specific M2M communication device.

6. The method according to claim 1, further comprising:
transmitting a request message for requesting which the specific M2M communication device want to be a representative of the M2M communication device group, to the base station; and
receiving a message indicating that the specific M2M communication device will be used as the representative of the M2M communication device group, from the base station as a response to the request message.

7. The method according to claim 1, further comprising:
broadcasting an indication message indicating that the specific M2M communication device is a representative of the M2M communication device group,
wherein the indication message includes at least one of an ID of the specific M2M communication device, the group ID, an M2M communication type of the group, and location information of the specific M2M communication device.

8. The method according to claim 7, further comprising:
in response to the indication message, receiving a join request message from an M2M communication device having the same M2M communication type as an M2M communication type of the M2M communication device group,
wherein the join request message includes an ID of the M2M communication device configured to transmit the join request message.

9. A group-based M2M communication method of performing with a base station, as a representative of a M2M communication device group, a plurality of M2M communications are included in the M2M (Machine to Machine) communication device group and a specific M2M device is used as a representative of the M2M communication device group, the method comprising:

performing an initial network entry procedure with the base station, wherein at least one of location information, battery information, and signal quality information of an M2M communication device configured to perform the initial network entry procedure is provided to the base station during the initial network entry procedure;

receiving an indication message including information of at least one candidate M2M communication device capable of being used as the representative of the M2M communication device group, from the base station, wherein the indication message includes a group ID of the M2M communication device group and a list of IDs of the candidate M2M communication devices;

receiving, by the specific M2M device from the base station, a join request message for the M2M communication device group, wherein the specific M2M communication device is selected considering the list contained in the received indication message;

transmitting, by the specific M2M device to the base station, a join acceptance message for the M2M communication device group; and receiving a representative M2M communication device indication message indicating that an arbitrary M2M communication device is a representative of the M2M communication device group, from the arbitrary M2M communication device, wherein the representative M2M communication device indication message includes at least one of an ID of the arbitrary M2M communication device, a group ID of a group represented by the arbitrary M2M communication device, an M2M communication type of a group represented by the arbitrary M2M communication device, and location information of the arbitrary M2M communication device.

10. The method according to claim 9, further comprising:
in consideration of the representative M2M communication device indication message, transmitting a join request message for an M2M communication device group represented by the arbitrary M2M communication device to the arbitrary M2M communication device.

11. The method according to claim 9, further comprising:
scanning the candidate M2M communication devices contained in the list; and
selecting the specific M2M communication device according to the scanning result.

12. The method according to claim 11, wherein the received indication message further includes frequency information used for scanning the candidate M2M communication devices.

13. The method according to claim 9, further comprising:
if the M2M communication device secedes from the M2M communication device group represented by the specific M2M communication device, transmitting a deregistration request message to the specific M2M communication device.

14. A Machine to Machine (M2M) communication device configured to perform group-based M2M communication comprising:
- a transceiver configured to transmit/receive signals to/from a base station and other M2M communication devices; and
- a processor functionally connected to the transceiver in such a manner that the transceiver transmits/receives signals to/from the base station and the other M2M communication devices,
- wherein the processor performs an initial network entry procedure with the base station using the transceiver, wherein at least one of location information, battery information, and signal quality information of a specific M2M communication device is provided to the base station during the initial network entry procedure, and
- if the transceiver receives a message indicating a representative of an M2M communication device group from the base station, the processor extracts a group ID of the M2M communication device group, an ID of the specific M2M communication device and a list of candidate M2M communication devices to be contained in the M2M communication device group from the message, and performs uplink and downlink communication with the base station using the group ID used to identify a representative of the M2M communication device group,
- wherein the transceiver transmits an indication message indicating that the specific M2M communication device is a representative of the M2M communication device group, to M2M communication devices contained in the list of the candidate M2M communication devices, wherein the indication message includes at least one of an ID of the specific M2M communication device, the group ID, an M2M communication type of the M2M communication device group, and location information of the specific M2M communication device.

15. The M2M communication device according to claim 14, wherein:
- if the transceiver receives an indication message including information of at least one M2M communication device capable of being used as a representative of the M2M communication device group from the base station, the processor extracts a group ID of the M2M communication device group and a list of IDs of the candidate M2M communication devices from the indication message, and
- the processor transmits a join request message for the M2M communication device group represented by the specific M2M communication device to a specific M2M communication device selected considering the list contained in the received indication message using the transceiver, and receives a join acceptance message for the M2M communication device group represented by the specific M2M communication device from the specific M2M communication device.

* * * * *